United States Patent
Newberry

(10) Patent No.: US 9,715,966 B2
(45) Date of Patent: Jul. 25, 2017

(54) SUPERCAPACITOR WITH EXTREME ENERGY STORAGE CAPACITY

(71) Applicant: Richard Down Newberry, Tuckahoe, NY (US)

(72) Inventor: Richard Down Newberry, Tuckahoe, NY (US)

( * ) Notice: Subject to any disclaimer, the term of this patent is extended or adjusted under 35 U.S.C. 154(b) by 249 days.

(21) Appl. No.: 14/688,392

(22) Filed: Apr. 16, 2015

(65) Prior Publication Data

US 2016/0358717 A1    Dec. 8, 2016

Related U.S. Application Data

(60) Provisional application No. 61/995,851, filed on Apr. 23, 2014, provisional application No. 62/071,109, filed on Sep. 15, 2014.

(51) Int. Cl.

| | | |
|---|---|---|
| *H01G 11/08* | (2013.01) | |
| *H01G 4/008* | (2006.01) | |
| *H01G 4/30* | (2006.01) | |
| *H01G 4/38* | (2006.01) | |
| *H01G 4/40* | (2006.01) | |

(Continued)

(52) U.S. Cl.
CPC ............ *H01G 4/008* (2013.01); *H01G 4/012* (2013.01); *H01G 4/1218* (2013.01); *H01G 4/1227* (2013.01); *H01G 4/20* (2013.01); *H01G 4/30* (2013.01); *H01G 4/38* (2013.01); *H01G 4/40* (2013.01); *H01G 2/16* (2013.01)

(58) Field of Classification Search
CPC ........ H01G 11/08; H01G 11/16; H01G 11/34; H01G 11/37; H01G 9/042; H01G 9/0525; H01G 4/008; H01G 4/30; H01G 4/38; H01G 4/40; H01G 4/20; H01G 4/012; H01G 4/1218; H01G 4/1227; H01G 2/16; F23N 2035/30; F23N 5/203

See application file for complete search history.

(56) References Cited

U.S. PATENT DOCUMENTS

| | | | | |
|---|---|---|---|---|
| 5,520,992 A * | 5/1996 | Douglas | ................. | H01G 4/008 |
| | | | | 257/E21.008 |
| 6,914,769 B2 * | 7/2005 | Welsch | ................. | H01G 9/042 |
| | | | | 257/E21.013 |

(Continued)

*Primary Examiner* — Michael Zarroli

(57) ABSTRACT

A supercapacitor, principally ceramic, with a fast recharging rate and extremely high energy density. Energy densities can exceed 9.5 KW-hr/L (0.27 MW-hr/ft$^3$). High permittivity, high voltage breakdown and nanoporous electrodes achieve these features. High permittivity is reached through a ceramic dielectric consisting of a titanium oxide variant, doped with various combinations of trivalent positive ions. Example: $(Al_{0.5}Nb_{0.5})_{0.5\%}Ti_{99.5\%}O_2$. The dielectric permittivity is further increased by adding layers of conductive island matrices placed in the dielectric. Charge capacity is expanded by use of nanoporous electrodes with an effective area over twenty times a flat surface electrode. Example: graphene. The key process involves sintering wafers, adding conductive island matrices' conductors, typically vacuum impregnating wafers with a polymer, then stacking wafers and electrodes, followed by connecting electrodes. Subassemblies are then stacked into unlimitedly larger macro-assemblies.

14 Claims, 3 Drawing Sheets

(51) Int. Cl.
*H01G 4/012* (2006.01)
*H01G 4/12* (2006.01)
*H01G 4/20* (2006.01)
*H01G 2/16* (2006.01)

(56) References Cited

U.S. PATENT DOCUMENTS

| | | | |
|---|---|---|---|
| 7,760,487 B2 * | 7/2010 | Karnik | C04B 35/495 |
| | | | 361/528 |
| 2016/0088731 A1 * | 3/2016 | Daghighian | H05K 1/115 |
| | | | 174/259 |
| 2016/0343511 A1 * | 11/2016 | Wakatsuki | H01G 9/032 |

* cited by examiner

FIG. 1 NEWBERRY SUPERCAP-BATTERY

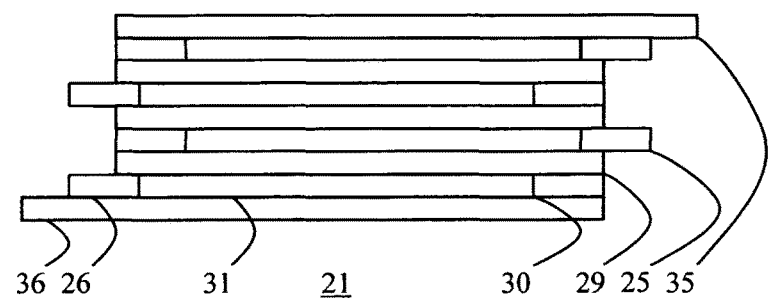
FIG. 5 STACK

SUPERCAPACITOR WITH EXTREME ENERGY STORAGE CAPACITY

BACKGROUND OF THE INVENTION

Effective means of powering vehicles for reasonable distances between refuelings has necessitated very high energy density fuel sources. The comparatively low efficiencies of internal combustion engines added to the need for the comparatively high energy density fossil fuels we use today. Fuel cells are a means of improving fuel to energy conversion efficiency, but are costly and complicated to use with these conventional vehicle fuels. Use of hydrogen or methane gas simplifies the fuel cell, but adds significant safety issues, storage difficulties, as well as reduced energy densities. Numerous other technologies are also under development to improve the various issues of cost, pollution, carbon footprint, safety, driving range, infrastructure impact, sustainability, toxicity, global component and resource acquisition socio-political complications, and overall performance.

The cost per driving mile of electricity is considerably less than gasoline. For example, in 2015, the more current technology electric vehicles (EV) get about 6 miles per kWh. The average cost of electricity in the U.S. is about 12 cents per kWh, resulting in a cost per mile for EV's to be about 1.99 cents. The current technology hybrid cars typically get about 45 MPG. At the typical gasoline cost of $2.42/gallon [March 2015], the average hybrid costs about 5.3 cents per mile when running on the gasoline engine. When running on an externally charged battery, their cost is at 1.99 cents/mile. If they average equal miles on gasoline and externally charged battery, the hybrid typically cost about 3.6 cents/mile. Thus the better hybrid cars compared to the typical EV cars cost about twice as much per mile to fuel. The average gasoline vehicle typically about 2.9 times as much to operate versus current EVs. Supercapacitor vehicles (SCV's) are relatively simple in design, have fuel storage means (supercap's) that last many times longer and cost considerably less than any current battery technology, as well as any fuel cell or internal combustion engine technology. The present supercapacitor invention is good for the typical life of the vehicle, and can be removed for use in other vehicles. Maintenance is expected to be far less frequent and much lower cost, as well, compared to current EV batteries. This is due to supercapacitors only moving electrons [charge] around versus chemical batteries like lithium-ion that move molecules that are millions of time bigger in diameter than electrons and have to slowly slog their way through a sea of other molecules causing battery deterioration over time, unlike tiny, speedy electrons.

Battery technologies have improved greatly in recent years, with Li-ion leading the pack. Yet even Li-ion batteries are much lower energy density, much more costly, have far shorter lifespans, have safety issues such as chemical malfunction explosion potential, much shorter driving ranges, are much heavier, and take magnitudes longer times to recharge than these NSB's. Fuel cells are much more costly, more complicated, and continue to either use mostly conventional fossil fuels or less safe hydrogen, which requires a much more significant infrastructure changeover than the NSB supercapacitor.

The current invention addresses these issues, resulting in a simple, low cost, extremely high energy density, low maintenance, safe, low operating cost, and efficient solution allowing very long travel range and fast recharges with high power delivery for vehicle applications. Additionally, high energy capture rates for very long storage periods with simple energy conversion to useable power for alternative energy systems, as well as grid power cost reduction for off peak storage with practically no power loss during grid downtimes for grid applications. Also, when storage capacity is maximized out, the additional generated power can be sold to the grid.

SUMMARY OF THE INVENTION

The principle anticipated applications of this invention are wherever high energy density electrical energy storage is needed. These applications include, but are not limited to, electric vehicles (EV), and alternative energy storage for both short term storage of energy for days to enable grid power averaging of alternative energy sources or many days without much sun or wind, or months for seasonal storage (e.g., solar energy that is high in summer months, and low in the winter months). Approximately eight cubic feet (2.8'× 2.8'×1') of NSB's can store enough additional energy, beyond the energy actively available, for a winter season's power needs, including heat, for a typical northern latitude house. Such a system makes alternative energy very practical; smaller alternative system sizing, no issues with extended cloudy or windless days, and very simple voltage conversion to useable power. Those using the grid can use a much smaller supercapacitor set of about one cubic foot to provide drawing all heat and electrical power during low cost off peak hours, even on the coldest days.

To achieve this extreme energy density in this supercapacitor present invention, those skilled in the art will appreciate that achieving both high dielectric constant and high dielectric strength in the same capacitor dielectric is very difficult. Tradeoffs for one or both parameters are the usual result to maximize the capacitor performance variables desired.

The invention consists of 8 key system elements;
1) A dielectric with a very high dielectric constant and extremely high dielectric strength for one or optionally two of two layers which contact one electrode.
2) A dielectric with extremely high dielectric constant and very high dielectric strength for the other optional layer which contacts the other electrode.
3) An alternative to using item 1, above, is to sinter the dielectric of item 2, then pressure inject a polymer by means of evacuating air from said dielectric, followed by high pressure injecting said polymer into all accessible pores. This creates a solid wall of dielectric and polymer, each of which has very high dielectric strength. This way, the dielectric constant remains unaffected by the polymer, but the dielectric strength is significantly increased. Also, non-polymer fillers may be used, such as oil.
4) Optional sub-layers of matrices of conductive islands between each pair of dielectric sub-layers within the dielectric of item 2, above, so as to increase the dielectric constant.
5) Extremely high electrode effective 'working' surface area to construction area ratio from nano-particle electrodes.
6) Means to protect the battery from damage or explosion.
7) A high efficiency DC to DC convertor from 500 VDC to 36 VDC, for example, et al.
8) Very high efficiency current regulated charging for fast charging.

The first element consists of a nonporous barium titanium dioxide ($BaTiO_3$) that has large permittivity over 100,000 and a dielectric strength over 7000 V/mil. The second element consists of a porous calcium copper titanium oxide ceramic, $CaCu_3Ti_4O_{12}$, or doped titanium dioxide. The doping material can be one of any of various materials, including a blend of niobium, aluminum and iron. This preferred doping consists of 0.05% iron, 0.2% aluminum and 0.25% niobium added to the 99.5% titanium dioxide for a formula of $(Al_{0.4}Fe_{0.1}Nb_{0.5})_{0.5\%}Ti_{99.5\%}O_2$. Another preferred blend is $(Al_{0.5}Nb_{0.5})_{0.5\%}Ti_{99.5\%}O_2$. Other dopant mixtures may consist of various ratios of aluminum/niobium, or just aluminum, or iron/niobium, or indium/niobium, or other combinations of trivalent positive ions. Furthermore, the ratio of titanium to oxygen will vary slightly to accommodate the variety of dopants that are replacing an equivalent amount of titanium. These inner layers of dielectric have a dielectric strength of over 500 V/mil and a dielectric permittivity over 500,000. Also, the primary ceramic, $BaTiO_3$, may be replaced by $CaCu_3Ti_4O_{12}$.

The third element is the alternative for elements 1 and 2, above. It consists of sintering the dielectric of item 2, then pressure injecting a polymer, as described above. Said polymer would be a low viscosity epoxy, such as Araldite LY564 or polyimide. A non-polymer, such as oil, may also be used.

Fourth, each dielectric layer in the stack is about 0.60 mil thick. Within each of these item 2 dielectric layers is the optional fourth element; 4 sub-layers of matrices of conductive islands of 0.002 mil thick aluminum foil squares, each island square preferably being about 0.32 mil×0.32 mil and separated from its neighbors by 0.04 mil. These matrix sub-layers serve to amplify the dielectric constant to between 700,000 and 1,000,000.

The fifth element, the electrode, consists of either zeolite-templated carbon or activated carbon or various other high surface area nanocarbon or other nano-metal or nanoconductor configurations for extremely high effective working electrode surface area. Such nanocarbon electrodes may be filled with an inert gas such as argon, carbon dioxide, air or other gas, or may be filled with a high dielectric strength fluid such as silicone oil. If such a fluid is used, it will only fill the voids of a moderately compact nanocarbon filler such that a significant amount of nanocarbon voids exist but good electrical connections among the nanocarbon solid sections persist. The thickness of these electrode layers are about 0.2 to 0.5 mils. Of course, the layers alternate, being offset a bit one side then the other, to allow easy connection of positive and negative layers. The electrodes may connect to one another by various means. A preferred method is to add very thin strips of aluminum foil to the outer edge of the nanocarbon electrode that extends outside the stack a few mils to allow for simpler means of interconnecting electrode layers by folding over each foil extension over the next foil extension, thus creating full aluminum faces on each side of the stack.

Both the high dielectric constant, amplified by the matrix sub-layers, and the high effective electrode surface area create an extremely high capacitance. The extremely high dielectric strength allows very high charge voltages, in the order of 500 to 3000 volts. Since the energy stored, E, is defined by $E=C\times V^2/2$, where C=capacitance, and V=charge voltage, the total energy density is extremely high. The matrix modified and doped CCTO or TO dielectric constant, exceeding 500,000, with an electrode effective surface area at least 20 times the apparent 'construction' area, along with the very thin 0.60 mil dielectric thickness all combine to create up to approximately 34 KJ/cc, or 960 MJ/ft$^3$, or approximately 0.27 MW-hr/ft$^3$ energy density per cubic foot. Long term storage applications of a few months are possible with minor leakage loss due to the leakage being less than 2% over 3 months.

The sixth element consists of various means to minimize damage to the battery under various conditions, as well as to prevent dangerous situations, like fire or explosions. This capacitor consists of small banks of individual capacitors that are connected in parallel, and then stacked. These small banks are then stacked into large banks. In a typical vehicle application, the assembly has about 60 large banks, each of which is resettable fuse protected. In the event that one bank shorts out, its fuse will open from the very high resulting current from the other banks, and these other banks will be protected, and continue to function normally. Such incidents should be rare, and the supercapacitor should have a very long service life, operating at or near full bank capacity. Also, should the supercapacitor be externally shorted, an inductor will limit the current surge long enough to be detected and the supercapacitor output open-circuited by a relay.

Finally, the complete supercapacitor is encapsulated in a shock resistant enclosure made of superstrong, but lightweight material, such as a nanocarbon based casing that exceeds the strength of steel, but weighs considerably less. Shock absorbing material will mechanically suspend the supercapacitor within the encasement. This and other material will also serve to absorb much of the energy of an explosion of the battery, with the outer heavy multilayered super-strong box fully containing the blast, which should be rare. Such a design also protects the battery from external forces, such as a vehicle accident.

The seventh element concerns conversion of the stored high voltage to useable low voltages which will be done via a high efficiency (>97%) converter circuits that generates the desired voltage and frequency, such as 12 VDC, 120 VAC, 36 VDC, 240 VAC etc. Conversely, the initial conversion of the supplied voltage from, say, a windmill, solar cell array, or the grid (off peak hours), to the charge voltage of, say, 1500 VDC, will also be done via very high efficiency (>97%) converter electronics.

The final eighth element involves use of a very high efficiency means of charging the NSB using current regulation which minimizes both energy losses and charging time. The topology is a boost type convertor and includes highly efficient current regulation which eliminates surges, allowing the system to provide the maximum current for the fastest charging time. Discharge current is also monitored and capacitor sections turned off if excess current is detected.

BRIEF DESCRIPTION OF THE SEVERAL VIEWS OF THE DRAWINGS

FIG. 5 shows the basic stack layout, with just a small portion of the layers shown. Layers 35 and 36 are the outside solid metal electrodes to which the inner electrode foils, 25 and 26, respectively, are electrically attached, upon stack assembly completion. Inner electrode paste 31 provides the expanded effective electrode surface area. Insulator 30, on opposite sides from foils 25 and 26, serve to both contain electrode paste 31 and to space dielectric wafer layers 29 apart.

DETAILED DESCRIPTION OF THE INVENTION

The key focus of this invention is to provide practical means to greatly improve the energy density and the charging speed of supercapacitors, which can then store extremely large amounts of energy, primarily geared towards use in electric vehicles, long term energy storage and portable electronic devices (e.g., cell phones).

Figure 1:
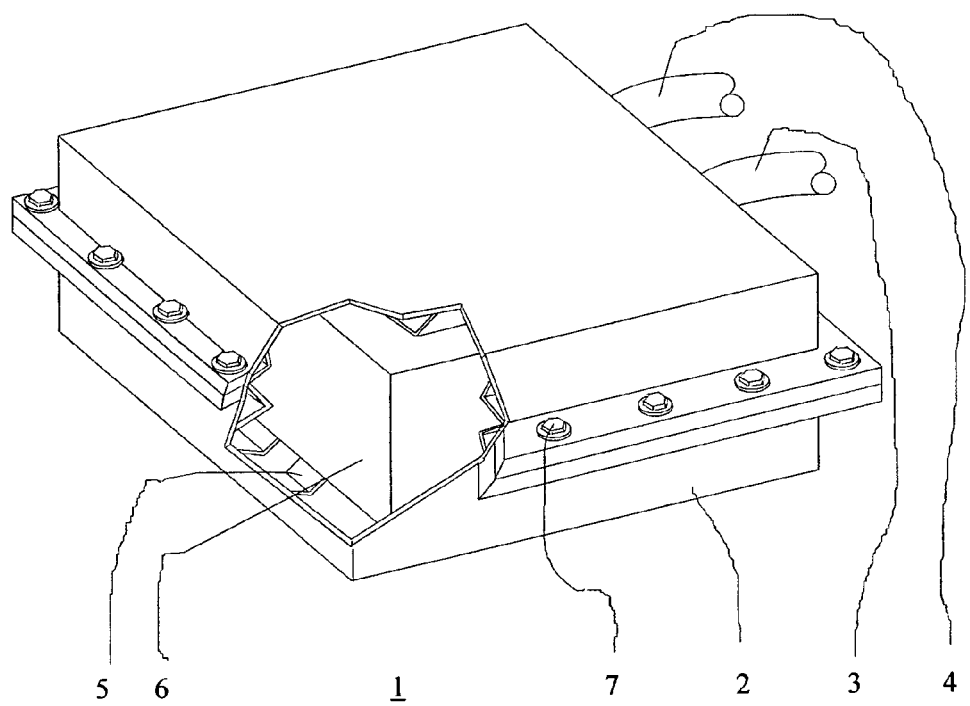
FIG. 1 shows the complete battery system 1, exposing the contents of explosion containment enclosure 2 of capacitor bank 6, shock absorber 5, flange bolts 7 and interface power and control cables 3 and 4.
Figure 2:
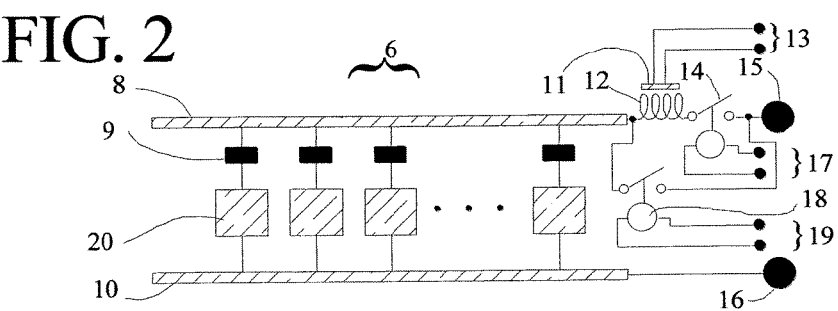
FIG. 2 shows the contents of capacitor bank 6 with sub-banks 20 with each having automatically resettable fuse 9, and a full bank protection circuit consisting of surge current rate limiter 12, current sensor 11 with output 13 and relay 14, main electrodes 8 and 10 with outputs 15 and 16, power relays (2) 18, and relay connections 17 and 19 to the central control.
Figure 3:
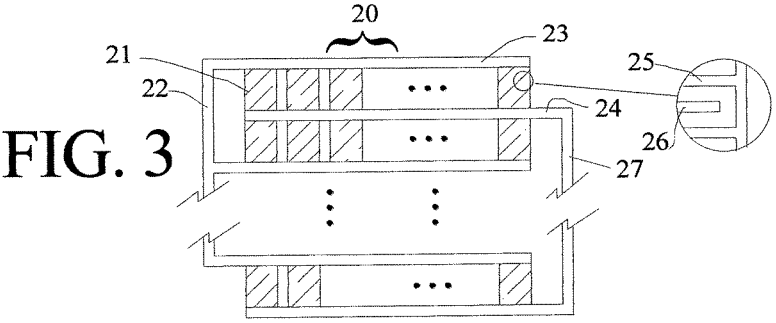
FIG. 3 shows the sub-bank 20, consisting of rows and columns of capacitors 21 arranged on alternating positive and negative sub-bank electrodes 23 and 24 with side connectors 22 and 27. The inset depicts the capacitor 21's inner structure of alternating electrodes 25/26.
Figure 4:
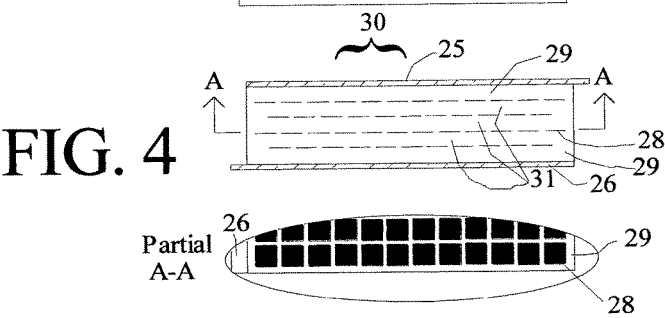
FIG. 4 shows the construction of a capacitor 34 single layer with electrodes 32 and 33 sandwiching dielectric material 29, which optionally contains multiple sub-layers of matrices of conductive islands 28. Electrode 32 or 33 consists of conductive foil 25 or 26, respectively, electrode paste 31, and insulator 30.

The goal of extremely high energy density is achieved by a combination of very high dielectric constant and very high dielectric strength. The chief means of achieving the superdense energy characteristics include the use of two layers of dielectric materials with one made of calcium copper titanium oxide (CCTO) and calcium copper titanium oxide mixed with dopants, or titanium dioxide mixed with dopants, with the other one of two dielectric layers consisting of high dielectric strength nonporous barium titanate. Alternatively, said barium titanate layer is not used, and instead, a polymer is injected into the porous inner layer to provide the high dielectric strength that the barium titanate layer provides, otherwise. Each sub-layer contains many embedded layers of dispersed and electrically conductive isolated domains matrix, and electrodes made of zeolite-templated carbon (ZTC), activated carbon, or other nanocarbon which have extremely high surface areas. These greatly increased surface area electrodes significantly increase the effective electrode area and thus, the capacitance per the equation $C = e_r \times e_0 \times A/d$, where C is capacitance, $e_r$ is relative permittivity, $e_0$ is permittivity of space, A is normally plate area but here the effective area of all the exposed area in the ZTC or activated nanocarbon, and D is the electrode spacing. The nanocarbon, et al, is saturated in an inert gas, such as argon, air, or other gas, or filled with a liquid, such as silicone oil. FIGS. 4 and 5 depict this arrangement of nanocarbon electrodes which contain the dielectric layer 29.

Within the dielectric 29 are the conductive matrix layers each with conductive islands, 28, made of aluminum, copper, nanocarbon, or other conductive material. These matrices serve the function of artificially increasing the dielectric constant of the dielectric 29. Sufficient spacing between these matrix layers is maintained to keep an extremely high capacitor dielectric strength, allowing well over 500 volt charge capacity across very thin layers. These dielectric layers 29 have gargantuan permittivity over 100,000. Each dielectric layer 29 in the stack 21 is about 0.60 mils thick. Within each dielectric layer 29 are five sub-layers with 4 sub-layer inserts of matrices of conductive islands of 0.002 mil thick squares, here aluminum, with each island square being about 0.32 mil×0.32 mil and separated from its neighbors by 0.04 mil. These matrix sub-layer inserts serve to amplify the dielectric constants of the dielectric to between 400,000 and 700,000. The nanocarbon electrode layers, in this preferred embodiment, are 0.2 mils thick. In this embodiment, there are 60 capacitor stacks 21 per multicapacitor 20, and 200 multicapacitors per battery 6. Each multicapacitor 20 is 2"×2"×2", and each capacitor 21 is about 0.5"×0.5"×0.5". Each capacitor stack 21 has about 600 layers 34. These 600 layers are made in 50 layer sections (about 40 mil thick) and then stacked to make a full stack 21. This extreme energy density allows for over a 600 mile travel range for a modestly small automobile using three cubic foot size capacitor module (=2'×3'×6" thick, weighing approximately 300 pounds, or about the same weight and size of a conventional internal combustion engine today.

Manufacturing in this preferred embodiment consists of first manufacturing thin wafers of dielectric. These are made by first milling the various powders used in the mixture, weighing out the proper proportions, drying the powders, mixing these ingredients, followed by pressing them into layer wafers as described in this preferred mixture. A bulk quantity of each raw powdered chemical was extracted from its storage container and placed into a 150° C. oven for a period at least 12 hours to remove any residual traces of water. Over 99.9% pure aluminum oxide ($Al_2O_3$), Niobium Oxide ($Nb_2O_5$) and $TiO_2$ powders were then weighed into sterile weighing containers in the proportional amounts: 0.1600 g of $Al_2O_3$, 0.4173 g of $Nb_2O_5$, and 100.0 g of $TiO_2$ and vigorously mixed under ethanol for over 15 minutes. The mixed powders were dried at room temperature, heat treated at 150° C. for about an hour and then inserted into a titanium die and compacted through the application of about 40 kpsi pressure to form a square of 0.5" per side and 0.0006" thick. These squares were sintered in a box furnace at a setting of 1500° C. for 5 hours to form dense, crystalline ceramic wafers. The wafers have a dielectric constant well in excess of $4 \times 10^4$ and an extremely low loss tangent (about 0.15) for high permittivity materials, particularly at temperatures less than 200° C.

The capacitor stack was constructed by starting with a solid electrode of conductive metal 36, preferably aluminum, followed by a 0.0002" thick perimeter insulator 30, preferably polyimide on three sides, each being about 0.1" wide each side, with the fourth side being 0.0002" thick metal conductor 25 or 26, preferably aluminum foil, 0.1" wide on top of the base electrode and another 0.005" sticking out to one side of the stack. The middle recess thus formed was then evenly filled with preferably a zero-templated carbon (ZTC) or a nano-powder of carbon, metal or other conductor 31, with either electrode material mixed with preferably silicone oil, just enough to fill any air gaps. This is done prior to placement by proper oil/carbon proportioning, followed by vacuum degassing. These layers 32 or 33 consist of 26 or 25 foil, respectively, with electrode paste 31 and insulator 30. Upon this stack is then placed a dielectric wafer 29 in an evacuated assembly chamber. Upon this wafer is again placed the three sided insulator 30, one sided overextending conductor 25 or 26 and carbon/oil recess filler 31. Thereafter, alternating layers of insulator/conductor/carbon-oil and dielectric wafer, with the conductor alternating one side 25, then the opposite side 26 to form alternating positive and negative electrode contacts. Once the specified stack height is reached, it is topped by a full solid metallic electrode 35, preferably aluminum. The electrode foil extensions on either side are then folded up to contact adjacent foils then pressure electrically connected with each other and with either the top solid electrode or the bottom solid electrode on each side. Arrays 34 are then placed in larger arrays 20 by attaching to top and bottom electrodes 23 and 24, and side connections 22 and 27. Large arrays 20 of these small capacitors are spaced apart across large top and bottom solid electrodes to create array capacitors that are further connected to other array capacitors to create large capacitance supercapacitor batteries 6 having capacitances from millifarads to hundreds or thousands of farads, depending on the application. Arrays 20 are each attached to the full battery assembly via the major electrodes 8 and 10, connecting externally via contacts 15 and 16 to cables 3 and 4. Alternatively, additional layers of arrays of microconductor islands 28 can be lithographed in preferably five or six sublayers inside each dielectric layer 29. These can serve to amplify the dielectric constant. For simplicity, the preferred option is to leave out these sublayer island arrays 28, due to their adding cost and complexity. Later, a highly automated factory will make these matrix layers low cost.

Such high energy density supercapacitor batteries can serve many markets wherever rechargeable batteries are used. These applications will range from hearing aids to cell phones to electric vehicles to solar and wind farm power grids.

The other key focus of this invention is the inclusion of design features that will improve the safety issues of these types of energy storage devices. The nature of such capacitors is such that they can discharge very quickly if their output is shorted, or nearly so, or if they are damaged. In such situations, the quick release of the large quantity of energy could be damaging, such as high temperatures or fire, with possible injury or property damage.

The key safety improvement features include;
1. A supercapacitor battery assembly 1 is in enclosure 2 by means of lightweight, super-strong materials and design, so as to minimize damage to the supercapacitor 6, and to contain any resulting damage within this enclosure. Heavy gage, multilayered walls and numerous flange bolts 7, would contain any explosion, along with shock absorbers 5 and other energy absorbing material (not shown) placed within the walls of the enclosure.
2. Means to isolate damaged supercapacitor sections, so as to eliminate damage to other sections, and to allow continued use of the remaining good sections. Such means may include resettable fuses 9, relay switches 14 and 18 controlled via output contacts 17 and 19, or inductor 12, as well as current sensors 11 and their outputs 13. These means will protect against external load shorting across output cables 3 and 4 by opening relay 14 upon detection of excessive current by sensor 11 via outputs 13, which is preferably a Hall type sensor.
3. Considerations for rapid recharging means for these supercapacitors, which do not adversely affect the above discharge limiting feature, by use of relay switch 18, which eliminates current rate limiting inductor 12.

What is claimed is:
1. A capacitor designed to have extremely high energy density by virtue of construction having:
   a) A dielectric, titanium dioxide, doped with a trivalent positive ion or ions such as aluminum, iron or niobium, with the preferred option being very low doping levels of niobium, $Ni_{0.25\%}$ and aluminum, $Al_{0.25\%}$, in a main constituent of titanium dioxide, $Ti_{99.5\%}O_2$; mixed, compressed over 40,000 psi and sintered at 1500° C. for at least 5 hours, and
   b) the dielectric layer being impregnated with a low viscosity and high dielectric strength epoxy, such as polyamine, or polyimide, or other polymer or liquid such as oil, and
   c) having multiple layers of matrices of isolated conductive islands embedded in the dielectric layer so as to amplify the effective dielectric constant of said dielectric, and
   d) having thin electrodes consisting of zeolite-templated carbon (ZTC) or other nanocarbon, or nanoaluminum or other nanotechnology conductor in a relatively inert atmosphere, such as argon, or a liquid, such as oil, or a polymer so as to create an effective electrode nanoconductor surface area many times larger than the apparent area of overall width and length.

2. A capacitor design, such as in claim 1, in which dielectric layers are less than 2 mils, and preferably less than 0.60 mils.

3. A capacitor design, such as in claim 1, which has electrode layers of nanoaluminum, zeolite-templated carbon (ZTC), activated carbon or other nanotechnology conductor, is in argon or other relatively inert gaseous atmosphere, or in liquid such as oil, of a total thickness preferably less than 0.2 mil.

4. A capacitor, such as in claim 1, for high energy density applications, consisting of many parallel or parallel-series combination banks, which has high current/high voltage fuses connecting the various parallel banks to isolate banks that may short out.

5. A capacitor design, such as in claim 4, which uses automatically resettable fuses.

6. A capacitor design, such as in claim 1, that is encased in a lightweight, high strength material, containing shock absorbing elements, to protect the capacitor assembly from damage in the event of an accident, or other causes, and which will contain any explosion of the battery.

7. A capacitor design, such as in claim 1, wherein the output current is limited in build-up rate by an inductor.

8. A capacitor design, such as in claim 1, wherein the output current is measured by a sensor, such as a Hall device.

9. A capacitor design, such as in claim 1, wherein the output can be shut off by a switching device, such as a relay.

10. A capacitor design, such as in claim 1, wherein the charging current can be much higher than the allowed discharge current by a method of a switch across the discharge current limiting devices, such as a relay or a rectifier.

11. A capacitor design, such as in claim 1, wherein the average doped $TiO_2$ and the remaining particle sizes are 0.02 mil diameter or less.

12. A capacitor design, such as in claim 1, which for each cubic foot in volume, has an electrode thickness of 0.2 mil, a dielectric thickness of 0.60 mil, has over 220 farads, can be charged to 3000 volts or more, and stores at least 0.96 GJ (0.27 MW-hrs) of energy.

13. A capacitor design, such as in claim 1, which may be used in electric energy powered vehicles, including, but not limited to, cars, trucks, locomotives, or any other transportation methods.

14. A capacitor design, such as in claim 1, which may be used for electrical energy storage for stationary applications such as building power, alternative energy storage, power grid storage, or any other stationary application.

* * * * *